United States Patent [19]

Enriquez

[11] Patent Number: 4,555,724
[45] Date of Patent: Nov. 26, 1985

[54] ELEVATOR SYSTEM

[75] Inventor: Emanuel E. Enriquez, West Caldwell, N.J.

[73] Assignee: Westinghouse Electric Corp., Pittsburgh, Pa.

[21] Appl. No.: 544,196

[22] Filed: Oct. 21, 1983

[51] Int. Cl.⁴ ............................................. H04N 7/18
[52] U.S. Cl. ................................. 358/93; 187/29 R; 358/107
[58] Field of Search ........................ 358/93, 108, 107; 340/20, 937, 825.28, 825.29; 187/29 R

[56] References Cited

U.S. PATENT DOCUMENTS

| 2,602,524 | 7/1952 | Shirley | 358/108 |
| 3,641,263 | 2/1972 | Rhoads | 358/93 |
| 3,971,885 | 7/1976 | Kito | 358/93 |
| 3,999,631 | 12/1976 | Iwasaka | 187/29 R |
| 4,047,205 | 9/1977 | Grosskopf | 358/107 |
| 4,303,851 | 12/1981 | Mottier | |
| 4,473,133 | 9/1984 | Enriquez | 187/29 |

Primary Examiner—Howard W. Britton
Attorney, Agent, or Firm—D. R. Lackey

[57] ABSTRACT

Apparatus and methods for determining the load in an elevator car, including the preparation of a video image of the car which has a predetermined number of picture elements (pixels). The gray scale level of each pixel is determined and compared with a reference value related to the gray scale level of the same pixels when the elevator car is unloaded. Those pixels whose gray levels have a predetermined relationship with the predetermined reference value are considered "loaded" pixels and the number of such loaded pixels is compared with the total number of pixels to obtain an indication of car load.

6 Claims, 10 Drawing Figures

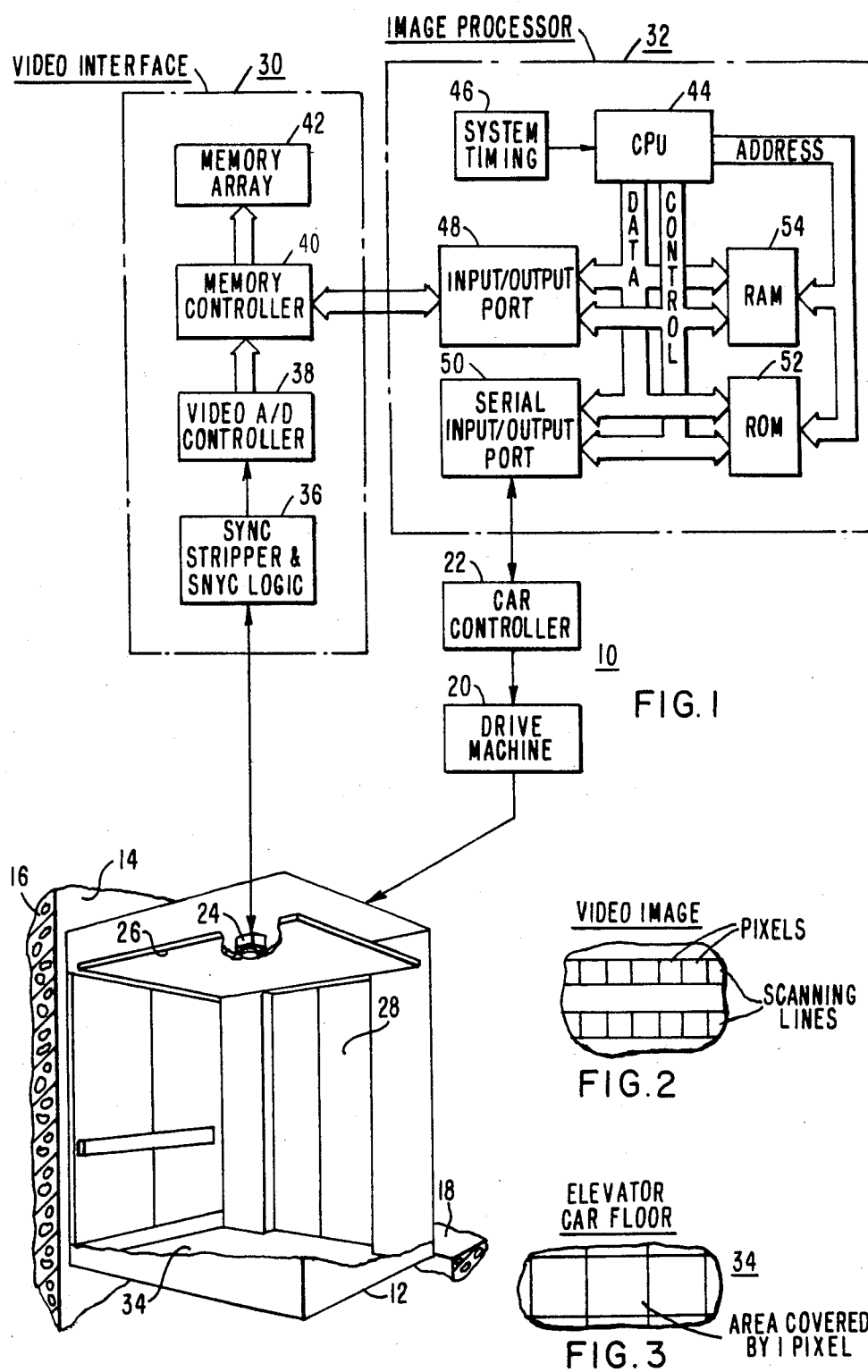

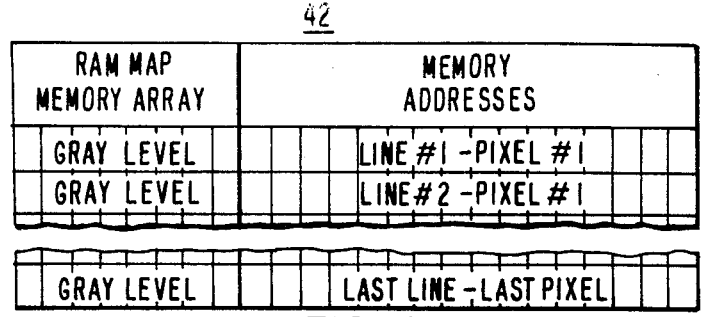
FIG. 4
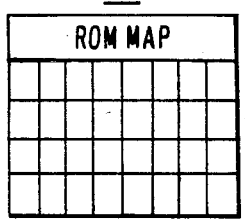
FIG. 6
FIG. 7
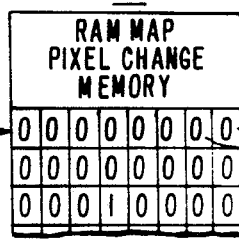
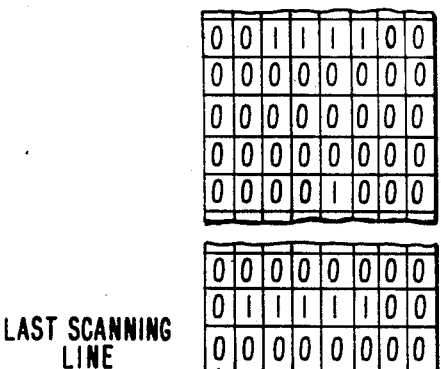
FIG. 8
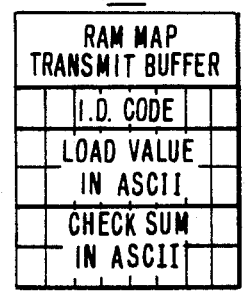
FIG. 9

ELEVATOR SYSTEM

BACKGROUND OF THE INVENTION

Field of the Invention

The invention relates in general to elevator systems, and more specifically to new and improved methods and apparatus for determining load in an elevator car.

Description of the Prior Art

In the prior art, the load in an elevator car is usually determined by apparatus which detects the weight of the load in the car. For example, weight switches are installed at the bottom of the elevator car. Such switches, however, are subject to mechanical misadjustment, and when misadjusted, they give inaccurate readings. Such switches may also give inaccurate readings for other reasons as well, such as an uneven load distribution in the elevator car. Also, regardless of how accurate the indication of the load weight is, it may still give an inaccurate indication of how the space in the elevator car is occupied. For example, bundles, vehicles, wheelchairs, strollers, children, and the like, may consume considerable space without adding significantly to the weight of the car load. Thus, a downwardly traveling elevator car which should be by-passing down hall calls because there is no more room for passengers, may stop at every such call if the weight of the load is not sufficient to trigger by passing. A "next" car at the main floor which should be dispatched because it can accept no more passengers, may continue to wait for the normal time period, if the car weight is not sufficient to trigger immediate dispatching.

SUMMARY OF THE INVENTION

Briefly, the present invention relates to new and improved methods and apparatus which enable the percentage of car occupancy to be determined at any given time, i.e., how much of the available floor space is actually occupied by people and/or objects. This determination may replace car weight switches, or it may be used in conjunction with such indications of actual weight to give a more complete picture of car load and occupancy for use in various load related strategies.

More specifically, the invention utilizes an inexpensive black and white video camera in the elevator car to make a plan view video image of the car contents from above, upon command from the elevator car controller. The video image has a predetermined number of picture elements (pixels), with each pixel representing a predetermined floor area of the elevator car. The gray level of each pixel is determined and each such value is compared with a predetermined reference value related to the gray level of the elevator car floor when devoid of load. Any pixel whose gray level is sufficiently different from the reference value is counted, and the count is compared with the total number of pixels to determine the precentage of car occupancy.

A person or object in the car of significance will always cause several adjacent pixels to have a gray scale level which is different than the reference level. In a preferred embodiment of the invention, small objects on the floor, such as scraps of paper, are eliminated from the count by counting only those pixels which have a predetermined relationship with adjacent pixels. In other words, a pixel is counted as being "loaded", only when an adjacent pixel is also "loaded".

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 1 illustrates an elevator system constructed according to the teachings of the invention;

FIG. 2 is a magnified view of a video image, indicating the pixels;

FIG. 3 is a fragmentary view of the floor of the elevator car, illustrating how each pixel of the image is related to a predetermined area of the floor;

FIG. 4 is a RAM map of the memory array which is part of the video interface shown in FIG. 1;

FIG. 6 is a ROM map of the ROM in the image processor shown in FIG. 1, illustrating certain constants which are used in the program shown in FIGS. 5A and 5B;

FIG. 7 illustrates a RAM register used by the program shown in FIGS. 5A and 5B;

FIG. 8 is a RAM map of a pixel change memory set up by the image processor shown in FIG. 1; and FIG. 9 is a RAM map of a transmit buffer which is loaded by the operating program shown in FIGS. 5A and 5B to send information relative to the occupancy of the elevator car to the car controller of the elevator system.

DESCRIPTION OF PREFERRED EMBODIMENTS

Figure 5A:
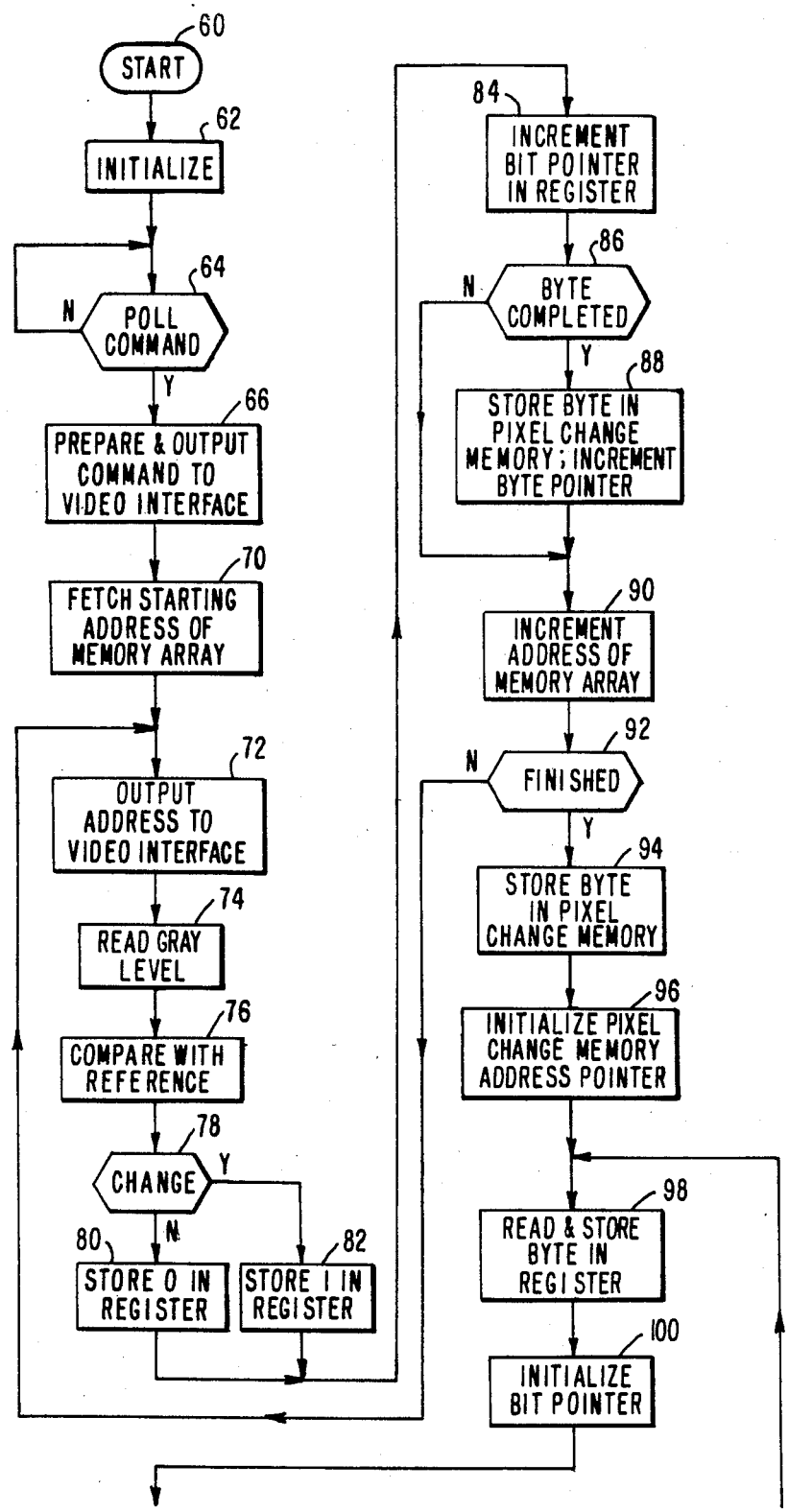
FIGS. 5A and 5B may be assembled to provide a detailed flow chart of an operating program for the image processor shown in FIG. 1.

Referring now to the drawings, and to FIG. 1 in particular, there is shown an elevator system 10 constructed according to the teachings of the invention. Elevator system 10 includes an elevator car 12 mounted in the hoistway 14 of a building 16 to serve the floors therein, such as floor 18. Elevator system 10 may be of any suitable type, such as hydraulic or traction. Car 12 is driven by a drive machine 20 under the control of a car controller 22. Since the drive and control 20 and 22, respectively, may be conventional, they are shown in block form. Suitable closed loop speed control, drive machine control and a car controller are shown in detail in U.S. Pat. Nos. 4,030,570; 4,277,825; 3,750,850 and 3,804,209, and these patents, which are assigned to the same assignee as the present application, are hereby incorporated into the present application by reference.

The present invention determines percent occupancy of car 12 by real time image processing of the contents of the elevator car 12. A video image contains a vast amount of information. If a video image were to be processed using pattern recognition techniques, however, it would require tremendous memory capacity, and would be uneconomical for the elevator load determining application. The present invention makes video image processing practical for elevator load determining, by taking into account "object sizes" defined by a minimum number of continuous "loaded picture elements" (pixels) based on the variations of the gray scale with respect to a reference image, rather than processing the video image by pattern contours of information. The gray scale is a series of achromatic tones having varying portions of white and black, to provide a full range of grays between white and black. The scale may be divided into a discrete number of steps, for example, providing 64 gray scale levels, providing, for example, 64 gray scale levels with a six-bit binary code.

The video image may be provided by an inexpensive black and white video camera 24 mounted inobtrusively in the ceiling 26 of the car 12 to obtain a plan view of the car contents. Camera 12 "freezes" the image of the car 12 upon command from the car controller 22, such as when the car controller 22 provides a signal to close the car doors 28 and associated hatchway doors (not shown). The "frozen" image is digitized by a video interface 30, and an image processor 32 provides the percent load information for the car controller 22.

The present application can utilize either a high or a low screen resolution with a varied number of gray scale levels. A practical embodiment, for example, includes a video interface controller providing up to 256×256 pixels, with up to 64 gray scale levels. A high resolution screen of 256×256 pixels would divide the image area and thus the area of car floor 34 into 65,536 pixels. As shown in the magnified fragmentary view of a video screen in FIG. 2, a picture element or pixel is a segment of the scanning line, the dimension of which, along the line, is exactly equal to the nominal line width. FIG. 3 is a fragmentary view of the floor 34 of the elevator car, divided into area per pixel. If the floor area of the floor 34 is 64 inches, for example, 16 pixels would cover one square inch of elevator floor area. A lower resolution than 256×256 pixels would also be suitable because of the comparatively large size of the objects involved, with the additional benefit of reducing memory requirements as well as processing time.

A video interface 30 which provides 256×256 pixel resolution and up to 64 gray scale levels, for example, is available from The Micro Works of California (P.O. Box 1110, Del Mar, CA 92014). It includes a parallel interface to be used with any S-100 bus microcomputer, as well as a sync stripper and sync logic circuitry 36, and an analog to digital converter 38 which converts the gray level of each pixel to a binary representation of its gray level. A memory controller 40, which includes a microcomputer, stores the binary representation of each pixel in a memory array 42. A suitable RAM map for memory array 42 is set forth in FIG. 4, illustrating that each pixel of each scanning line has its own memory address, with its gray scale level in binary being stored at its associated address.

The image processor function 32 may be preformed by a microcomputer, such as Intel's iSBC 80/24 TM single board computer, having a central processing unit (CPU) 44, system timing 46, parallel input/output ports 48 for communicating with the video interface 30, a serial RS232 port 50 for communicating with the car controller 22, a read-only memory (ROM) 52 for storing the operating program and system constants, and a random-access memory (RAM) 54 for storing information developed by the operating program.

Figure 5B:
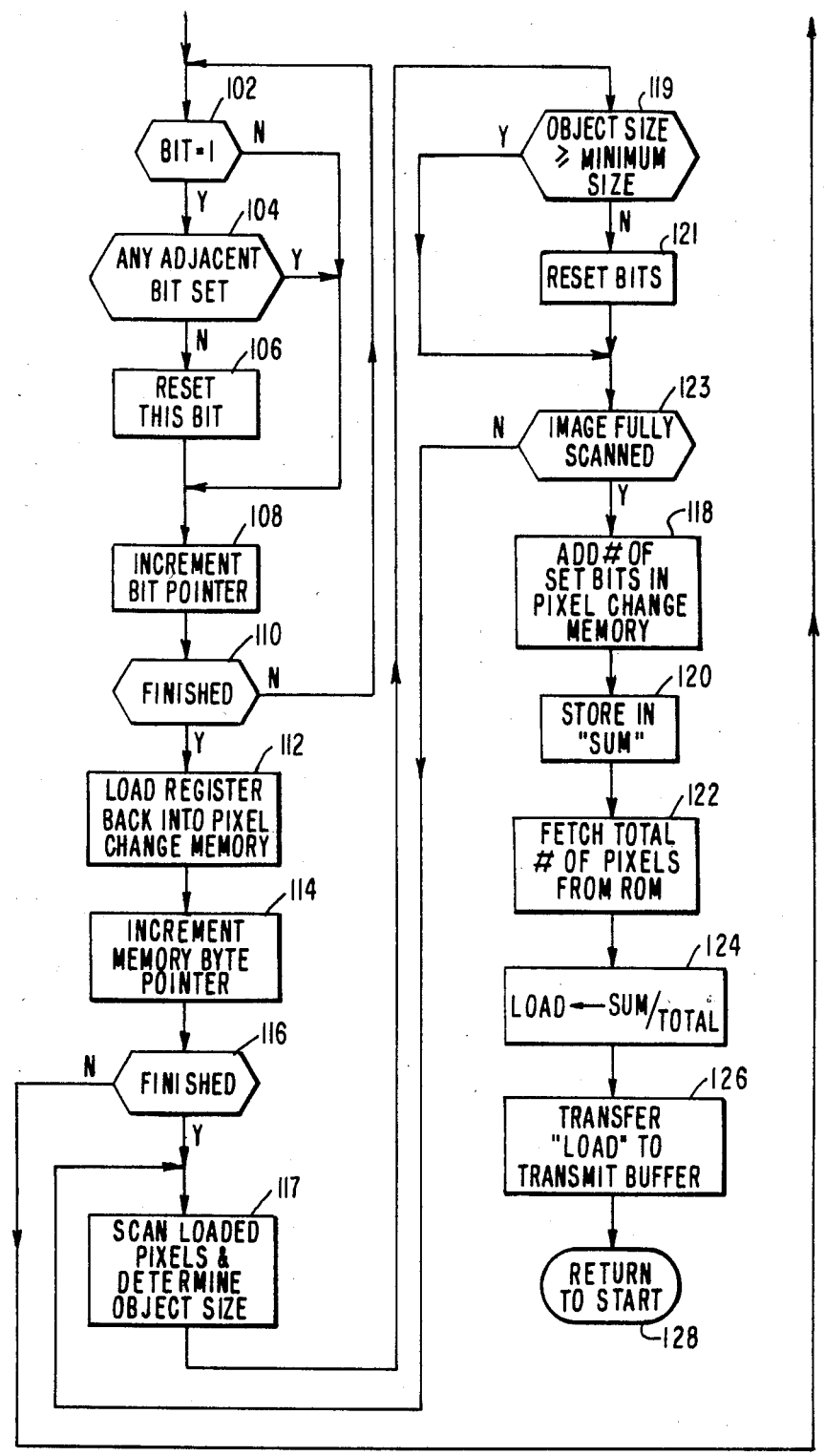

An examplary operating program for the image processor 32 is set forth in FIGS. 5A and 5B, which may be assembled to provide a detailed programmer's flow chart. The program of FIGS. 5A and 5B may include steps for establishing a gray scale reference level for a completely unloaded car, or the gray scale reference level may be established for the elevator car 12 prior to shipment to a job site. In the latter instance, the gray reference level would be one of the system constants stored in ROM, as illustrated in FIG. 6, which is a ROM map of ROM 52 shown in FIG. 1.

In a simplified embodiment of the invention, the floor 34 of the elevator car 12 is provided with a solid color chosen to provide a gray scale reference level which will be unlike the gray scale level of the majority of passengers and objects likely to be carried by the elevator car 12. For example, the covering for floor 34 may be near one limit or the other of the gray scale, e.g., white or black, or it may be at some predetermined intermediate value. A more general approach utilizes any color or pattern for the elevator floor, with the pixel gray scale pattern of the floor being stored in the image processor memory. Each image pixel would then be compared with its own unique reference levels to determine "loaded pixels". While this approach imposes greater requirements on the memory and execution speed, it is economically feasible because of the continuous trend of the computer industry in providing faster processors and lower cost memories.

The program of FIGS. 5A and 5B is entered at 60 when power is applied to the elevator system 10, and step 62 initializes the RAM's and pointers to the various registers and tables. Step 62 would also determine the gray level of each pixel of an image of the car when unloaded, if the reference level is not stored in memory. It would do this by scanning the unloaded car and storing the gray level of each pixel in memory. Step 64 checks the RS232 serial port 50 for a poll command or request from the car controller 22. Car controller 22 provides such a request when it desires to know the percent loading of the elevator car 12. The car controller 22 may automatically provide such poll request when the door is closed at the start of the run. It may also provide such request at predetermined short intervals when the car has been designated as the next car to leave the main floor, and it is standing at the main floor with its doors open. When the percent loading reaches a predetermined value, the car may be dispatched immediately without waiting for the normal non-interference time for the NEXT car to expire.

A co-pending application Ser. No. 447,059, filed Dec. 6, 1982, now U.S. Pat. No. 4,473,133, entitled "Elevator System", which is assigned to the same assignee as the present application, sets forth a suitable communication system and polling protocol, and thus the polling step 64 will not be described in detail.

When step 64 detects a poll command, step 66 prepares and outputs a command to the video interface, requesting that a video image of the car 12 be obtained, digitized and stored in memory array 42. If the function of the image processor 32 is not provided by a dedicated microcomputer, step 66 may exit the program and video interface 30 may be arranged to provide an interrupt when it has completed its task. For purposes of example, it will be assumed that the video interface prepares and stores the gray scale information for each pixel in memory array 42, such as in the format set forth in the RAM map of FIG. 4.

After the video camera 24 has scanned the screen to obtain the image, and video interface 30 has processed the image by converting each pixel to a gray scale level in binary, steps 70 and 72 address the first pixel of scanning line 1 in the memory array 42, with step 70 obtaining the initial or starting address from ROM 52, as shown in FIG. 6, and with step 72 applying the address to the parallel port 48. The memory controller 46 returns the digital value of the gray scale of the addressed pixel, which is read by step 74.

Step 76 obtains the gray scale reference from ROM 52, or, if the program of FIGS. 5A and 5B established the reference through appropriate steps, it would obtain the reference from RAM, and step 76 compares the reference value with the gray level of the pixel obtained in step 74. A predetermined tolerance may be established for comparing the gray scale level with the reference level. For example, if the gray scale has 64 steps established by a six bit binary number, a predetermined number of the least significant bits (LSB) may be ignored in the comparison. Thus, step 78 may compare only the four or five most significant bits (MSB) for a match. If the selected bits match, step 80 stores a logic zero in a predetermined RAM register. FIG. 7 sets forth a suitable format for an eight bit RAM register, having a bit pointer which was initialized to bit position zero by step 62. Step 80 stores the logic zero at the location of the bit pointer. If step 78 detects a change, step 82 stores a logic one at the location of the bit pointer.

Step 84 increments the bit pointer of the RAM register shown in FIG. 7, and step 86 checks to see if the byte has been completed. If it has, step 88 stores the byte at the byte pointer of a pixel-change memory stored in RAM 54. FIG. 8 is a suitable format for the pixel-change memory. The byte pointer was initialized in step 62.

Step 88 proceeds to step 90, as does step 86 when the byte has not been completely filled. Step 90 adds one to the current address of the memory array, and step 92 checks to see if all of the pixels have been processed. If not, step 92 returns to step 72 to process the next pixel.

When all of the pixels have been processed, and the pixel change memory shown in FIG. 8 has been completed, the program may proceed directly to step 118 to start the percent load calculation. In a preferred embodiment of the invention, however, the pixel change memory is first reviewed to reset any bits which obviously cannot represent an object of concern. This is done by recognizing that a person or package of concern should result in at least a predetermined number of adjacent bits being set, with the smallest such number depending upon the resolution of the system. Even with a low resolution screen, set bits which have no adjacent set bit may be reset. A lone set bit may indicate a scrap of paper, or other object of no concern when determining elevator loading. Steps 96 through 116 perform this memory review function. Alternatively, or additionally, as desired, the loaded pixels may be scanned to determine the total number of adjacent loaded pixels which make up each object. If an object size is found to be less than a predetermined minimum size, selected to eliminate inconsequential items, the associated bits are reset. This memory review function is set forth in steps 117, 119, 121 and 123.

More specifically, step 94 proceeds to step 96 which initializes the pixel change memory address pointer. Step 98 reads and stores the associated byte in the RAM register shown in FIG. 7. Step 100 initializes the bit pointer of this register, and step 102 checks to see if the associated bit is set. If it is set, i.e., a logic one, step 104 checks to see if there is any adjacent bit set. If there is no set bit in any direction from the set bit in question, step 106 resets this bit, and step 108 increments the bit pointer. If step 102 finds the bit is not set, or if step 104 finds an adjacent bit set, both proceed to step 108 to increment the bit pointer.

Step 110 checks to see if all of the bits in the RAM register have been checked. If they have not all been checked, step 110 returns to step 102. When all of the bits of the byte have been checked, step 112 loads the contents of the register back into the pixel change memory, at the location of the byte pointer. Step 114 increments the byte pointer and step 116 checks to see if all bytes have been reviewed. If all bytes have not been reviewed, step 116 returns to step 98 to process the next byte. When all bytes have been reviewed, step 116 may proceed to step 117 for further memory review, or to step 118 as desired. Step 117 scans the loaded pixels to determine the object size of each coherent group of loaded pixels. Step 119 compares the object size with a predetermined minimum size stored to ROM, as shown in FIG. 6. If the object size is less that the minimum, step 121 resets the associated bits. If the object size is not less than the minimum, step 121 is skipped. Step 123 checks to see if all "objects" have been checked, advancing to step 118 if they have, and returning to step 117 if they have not.

Step 118 adds all of the set bits in the pixel change memory to provide a total of such set bits. If desired, a running total may be maintained of set bits by adding the number of set bits in each byte to a predetermined address "SUM" of RAM 54, with this step taking place between steps 110 and 112. If step 118 preforms the addition, step 120 stores the total at location "SUM".

Step 122 fetches the total number of pixels, referred to as "TOTAL", which is a constant stored in ROM 52, as set forth in FIG. 6. Step 124 divides "SUM" by "TOTAL", it changes the result from binary to ASCII, and it stores the result in memory location "LOAD". Step 126 transfers the value stored at "LOAD" to a transmit buffer, which thus contains the percent loading or load value. FIG. 9 is a RAM map which sets forth a suitable format for the transmit buffer. The transmit buffer, for example, may contain five bytes of information, with the first byte being an identification code which identifies the image processor as the source of the information, the next two bytes may be the load value in ASCII, and the last two bytes may be an error detection code "CHECK SUM" in ASCII. The information in the transmit buffer is sent to the car controller 22, and the car controller uses this information in its strategy related to car load. Even with relatively slow speed scanning by the TV camera 24, an indication of car load in percent can be provided in less than 2 seconds after the poll command detection in step 64.

The percent load may be used as the exclusive indication of car load, or it may be used in conjunction with weight switches, or any other indication of car weight, to give a more complete and accurate picture of actual car loading. For example, if car weight triggers bypassing of down hall calls by a down traveling car, the percent load figure provided by the image processor 32 may be used instead. Or, it may operate in parallel with the indication of car weight, triggering bypassing when the percent occupancy reaches a predetermined level, regardless of the weight of the load in the elevator car. As hereinbefore stated, the percent of the car load may be used to expedite dispatching of the "next" car, replacing the weight switches in this regard, or operating in parallel therewith.

By comparing percent occupancy after each stop of the elevator car, a change-in-load-per-floor record may be established, correlated with a time-of-day clock. This information may be stored and used to detect patterns for anticipatory dispatching of elevator cars.

The present invention is directed to providing a more accurate indication of actual car loading, and is not meant to be limited by the examples of possible usage in elevator strategy. In principal, the percent load may be used in any prior art strategy which formerly utilized indications of car load by the weight of the load.

I claim as my invention:

1. A method of determining elevator car loading, comprising the steps of:

providing a video image of the car, with said video image having a predetermined number of picture elements (pixels), determining the gray level of each pixel, comparing the gray level of each pixel with a predetermined reference value to determine loaded pixels, discarding loaded pixels which do not have a predetermined relationship with adjacent pixels, totalling the number of loaded pixels, after the discarding step, and comparing the number of loaded pixels with the predetermined number of pixels to obtain an indication of car loading.

2. The method of claim 1 including the step of determining the gray level of each pixel of an image of the elevator car when unloaded to provide the reference value.

3. Load determining apparatus for an elevator car comprising:

an elevator car, a video camera carried by said elevator car for providing a plan view video image thereof when loading is to be determined, with the video image having a predetermined number of picture elements (pixels), video interface means for determining the gray level of each pixel, means for determining the number of loaded pixels, including means providing an initial test for a loaded pixel by comparing the gray level of each pixel with a predetermined reference value related to an unloaded car, and means for applying an additional test to each pixel which passes the initial test, with said additional test passing only those pixels which have a predetermined relationship with adjacent pixels, and means for comparing the number of loaded pixels with the total number of pixels to obtain an indication of car load.

4. The load determining apparatus of claim 3 wherein the means for comparing the number of loaded pixels with the total number of pixels divides the number of loaded pixels by the total number of pixels.

5. The load determining apparatus of claim 3 including memory means having a memory bit associated with each pixel, with the means for comparing the gray level of each pixel with a predetermined reference value setting the memory bits of those pixels whose gray levels have a predetermined relationship with the predetermined reference value, and with the means for applying the additional test resetting the memory bits of those pixels which do not have the predetermined relationship with adjacent pixels.

6. The load determining apparatus of claim 5 wherein the means for determining the number of loaded pixels includes means for counting the number of set bits.

* * * * *